United States Patent [19]

Connolly

[11] 3,768,952
[45] Oct. 30, 1973

[54] MOLD CLAMP
[75] Inventor: Denis Connolly, Fremont, Ohio
[73] Assignee: Sund-Borg Machines Corporation, Fremont, Ohio
[22] Filed: Aug. 24, 1971
[21] Appl. No.: 174,454

[52] U.S. Cl. .............................. 425/450, 425/179
[51] Int. Cl. .................................... B29c 1/16
[58] Field of Search .................... 425/175, 176, 177, 425/178, 179, 180, 450

[56] References Cited
UNITED STATES PATENTS

| 476,088 | 5/1892 | Stiles | 425/179 |
|---|---|---|---|
| 1,921,925 | 8/1933 | Johnson | 425/179 |
| 1,841,491 | 1/1932 | Maynard | 425/450 UX |

*Primary Examiner*—H. A. Kilby, Jr.
*Attorney*—James G. Watterson

[57] ABSTRACT

Apparatus for holding molds together, including latch mechanisms for retaining mold members together and yieldably applying a compressive load thereto. A latch member of each latch mechanism is movably secured to one of two parallel platens that support opposed mold halves. One of the latch members of each mechanism is resiliently biased in a direction that urges the platens toward each other when the latch members of each mechanism are engaged. The biasing force is preferably applied by a torsion spring common to latch members of two latch mechanisms on opposite sides of the platens. A portion of the biased member of each mechanism is constructed to extend beyond an outer face of the platen to which it is secured in a position where a clamp used to press the platens toward one another will move the biased member into a latched position and pre-load the biasing spring so that the latch mechanisms will urge the platens together after removal from the clamp.

16 Claims, 3 Drawing Figures

MOLD CLAMP

BACKGROUND OF THE INVENTION

1. Field of the Invention

This invention relates to a mold clamp or latching mechanism for clamping mold parts together, especially mold parts for use with plastic injection molding machines.

2. Prior Art

In certain molding operations injection pressures or subsequently generated expansion pressures within a mold may tend to separate mold parts or sections. Latches of various types for securing mold halves together are of course known, but often merely hook over a fixed latch pin, sometimes with a linkage for drawing the latch down tightly over the pin. See, e.g., U. S. Pat. Nos. 1,197,834 and 1,184,491. In some operations mold sections are held together by a power operated clamp at the time material is introduced. This is the case in certain plastic injection molding machines. That approach alone is unsatisfactory if the clamping pressure must be maintained for any appreciable time after injection, because it increases the machine cycle time. In structural foam molding this can be a particular problem, because residual foaming pressure must be resisted for a substantial time after injection.

SUMMARY OF THE INVENTION

The present invention provides a clamping assembly for opposed mold members or so-called mold halves, with an energy storage device, such as a spring, that when preloaded acts through latching members of one or more clamping mechanisms to apply a compressive load to the mold parts, thereby yieldably retaining the parts together under a predetermined force. Mold separation cannot occur unless the interna' force exceeds the applied preload.

The clamping assembly is constructed and arranged so that moving the latching members of the clamping mechanism into latching engagement preloads the energy storage device. To this end, each clamping mechanism is comprised of first and second latch members, one carried with each mold half, and the energy storage device of the clamping assembly resi'iently biases a movable one of the latch members of each clamping mechanism in a direction that urges the mold halves together when the latch members are engaged.

To facilitate automatic loading of the two latch members of each mechanism, both are movable relative to the respective mold half with which they are carried, and are constructed so that clamping pressure applied to the mold halves at an injection molding station will move the latch member resiliently biased by the energy storage device to a position where the other latch member of the mechanism can move under an independent biasing force into latching engagement with the first member. When the clamping pressure of the molding machine is removed, the energy storage device applies a biasing force to the directly associated latching member in a direction that urges the mold halves together through the second latching member. This force can be as great in magnitude as required to resist the residual foaming pressures after injection, thereby permitting removal of the mold from the station immediately after injection to minimize machine cycle time.

In the preferred embodiment, two latch mechanisms on opposite sides of a mold function together as an assembly, and utilize a common energy storage device or biasing element. Each mechanism includes a pivoted bell crank lever on one mold part and a pivoted latching lever on the other. One arm of the bell crank lever latches with the latching lever and the other arm projects to a position engaged by the clamping mechanism of an injection molding machine. A torsion spring links the bell crank levers on the opposite sides of the mold. Engagement of the projecting arm of each bell crank lever of an assembly by the clamp of the molding machine pivots the bell cranks in opposite directions relative to and against the resistance of the torsion spring and moves the latching arm of each bell crank lever into a position where it is latched by the latching lever carried with the other mold part. Once the clamping pressure applied by the molding machine is released, rotation of the torsion spring and bell crank levers is resisted only by the latching levers, the mutual contact between opposed mold halves and the internal pressure generated or existing within the cavity or cavities of the mold halves. The actual force with which the mold halves are urged together is controlled by the torsion spring and the magnitude of spring deflection. In the event mold pressures develop above those that are desired, as controlled by the spring, the mold halves will be separated by the pressure, against the spring force, permitting material to escape to relieve the pressure.

Unlatching of the latch mechanisms is facilitated by utilizing a minimum over-center engagement between latching members so that only a slight movement of the latching lever toward the unlatched position and a slight camming of the bell crank lever against the biasing force that urges the mold halves together, will release the latching members. This may be accomplished, e.g., by striking the latching lever.

The present invention is especially useful with an automatic injection molding machine that cycles a plurality of molds through a number of stations, where the material is injected, cured and the molded part unloaded. In such a machine the mold halves may be secured to upper and lower platens that carry the clamping assemblies. When the platens are pressed together with the machine clamp at the injection station, the latch members of each assembly are pivoted into latching interengagement, which causes the torsion spring to twist. Upon removal of the mold from the main tonnage clamp after injection, the latch mechanisms resist the return of the torsion spring to its original condition and thereby apply the yieldable force of the spring to the mold parts, retaining them together during the curing portion of the operating cycle. In one embodiment of the invention, when the mold and platen assembly is thereafter moved to an unloading station, a latching lever of each assembly is struck by an abutment that pivots the latching lever away from the bell crank member to release the clamp for unloading. Since the levers of each assembly on both sides of the platens are biased by a common torsion spring, the release of the clamping mechanism on one side eliminates the force applied to that on the other, so as to release it as well. To resist reaction forces on the mold when the latching assemblies are released, pin and bushing assemblies interconnect the upper and lower platens, maintaining the mold halves aligned.

From the above it will be appreciated that a general object of this invention is to provide a latch mechanism for mold members that will yieldably apply a compressive load thereto, that can be automatically latched and pre-stressed when the mold is clamped for injection, and which can be conveniently released. This and other objects will become more apparent and a better understanding of this invention will be obtained from the detailed description that follows, when considered in connection with the accompanying drawings.

DETAILED DESCRIPTION OF A PREFERRED EMBODIMENT

Figure 1:
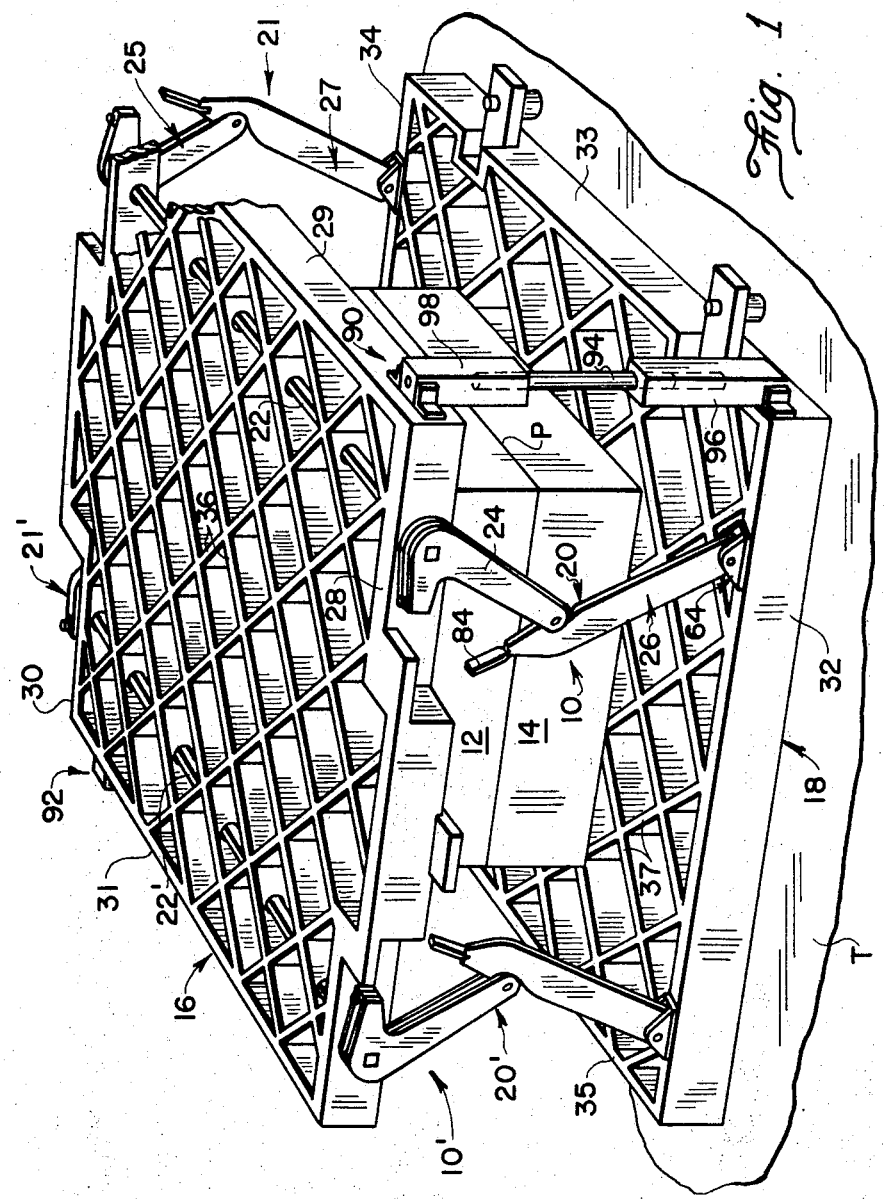
FIG. 1 is a perspective view of a mold, platen and clamp assembly for use with a plastic injection machine and embodying the present invention.

Two latch assemblies 10, 10', embodying the present invention are shown in FIG. 1, for retaining two mold halves or members 12, 14 together and for yieldably applying a compressive load to the mold members. While two latch assemblies are typically used, as shown, the number can vary, depending upon the construction of the mold. The latch assemblies 10,10' and the mold members 12, 14 are carried on platens 16, 18. Each latch assembly 10, 10' is comrised of two latch mechanisms 20, 21 and 20', 21', on opposite sides of the mold members, and a torsion spring 22, 22' connecting the latch mechanisms. Because the assemblies 10, 10' are identical, only assembly 10 will be described in detail.

Each latch mechanism 20, 21 of latch assembly 10 includes two latching members: a bell crank 24, 25 carried by the upper platen 16, and a latching link 26, 27 carried by the lower platen 18. When the members 24 and 26 are latched on one side of the mold assembly and the links 25 and 27 are latched on the other side, the torsion spring 22 is twisted and biases the members 24, 25 in directions (clockwise and counter-clockwise, respectively, as viewed in FIG. 1) that urge the platens 16, 18 and the mold halves 12, 14 together.

Typically, the platens 16, 18 that carry the latch assemblies and mold halves are rectangular in shape, although other shapes may be equally suitable. The platens shown are formed of four frame sides 28-31 and 32-35, and a multiplicity of reinforcing webs 36 and 37, respectively. In the arrangement shown, the lower platen is supported by and clamped to a movable table T. The mold halves 12, 14 are secured to the platens in a conventional manner, as by hold-down clamps or the like (not shown) and the mold halves are oriented to provide a parting plane indicated at P, generally parallel to the platens, with a cavity or cavities (not shown) of the mold halves opening at the parting plane. Apertures (not shown) are provided in the upper mold member for injection of material, such as structural foam plastic, to be molded. When the latch assemblies are unlatched, the mold halves can be separated by lifting the upper platen.

The torsion spring 22 extends across the platen 16, with opposite ends extending through the frame sides 28, 30 to engage with and apply rotational forces to the bell crank latch members 24, 25 when the spring is distorted, i.e., twisted about a longitudinal axis, from its normal configuration. The torsion spring shown is square in cross section but can suitably be of different construction, and is supported by bushings 41, 42 (FIG. 3) carried in the frame sides 28, 30 of the platen 16. A peripheral V-groove 43 in each bushing and a cone point set screw 44 held by the frame member and engaging each groove 43 locate the torsion spring axially while permitting relative rotation about its longitudinal axis, with respect to the platen. Opposite ends of the torsion spring extend beyond the frame sides and receive the bell cranks 24, 25 in fixed relationship. Both of the bell cranks 24, 25 are of identical construction and only the crank 24 will be described in detail.

The bell crank latch member 24 has a preloading arm 45 extending generally horizontally, i.e., along the adjacent frame side 28 of the platen, and a depending latching arm 46. The bell crank latching member 25, being identical to 24, but on the opposite side of the platen, will have its preloading arm extending in the opposite direction as shown in FIGS. 1 and 2, so that a downward force applied to each preloading arm at opposite ends of the torsion spring, will tend to twist and load the torsion spring.

Figure 3:
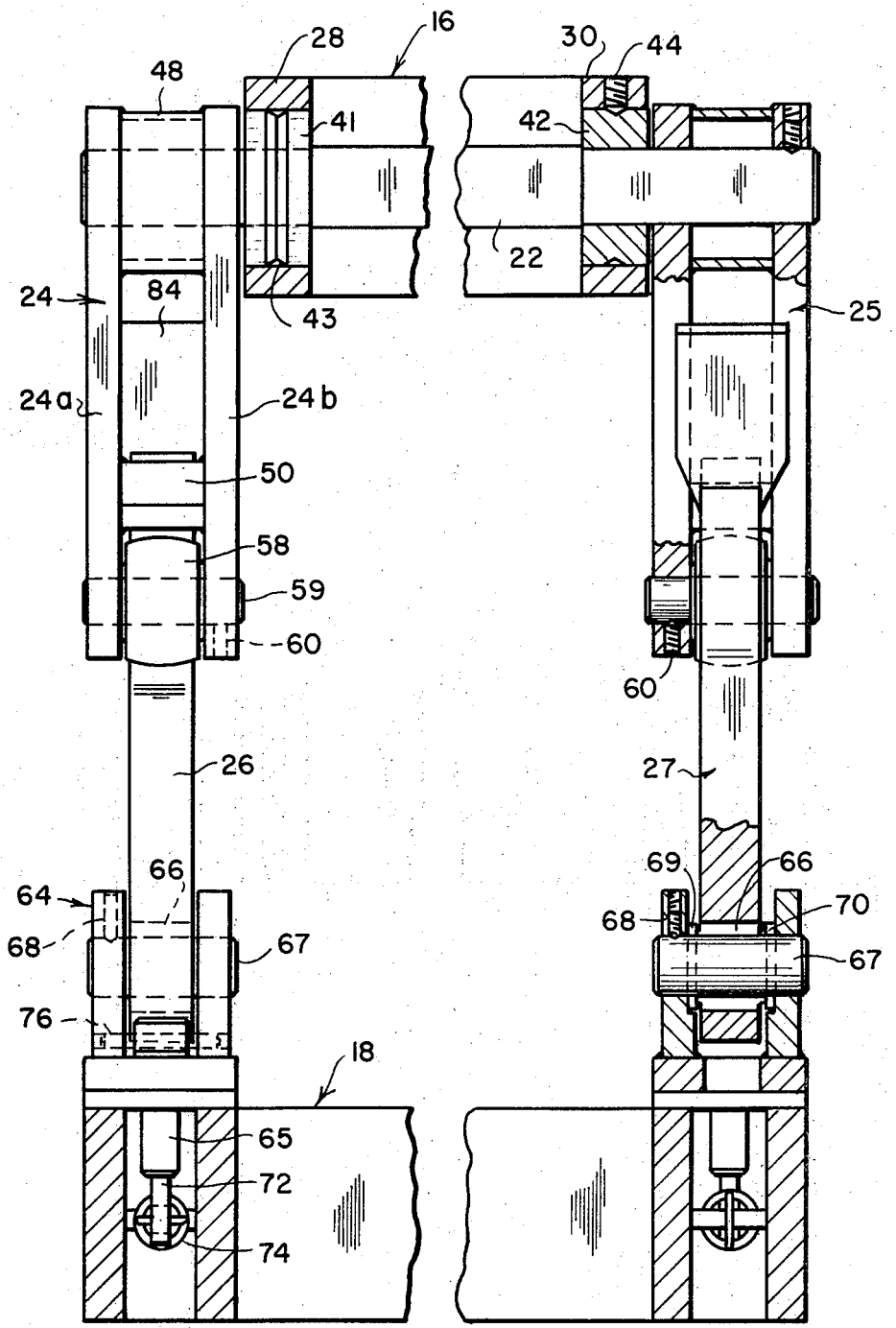
FIG. 3 is an end elevational view of the clamping assembly of FIG. 2, with parts in section, as viewed from the plane 3—3 of FIG. 2.

In the embodiment shown, the bell crank latch member 24 is formed of two laterally-spaced parts 24a, 24b, as best shown in FIG. 3. The separate parts are secured together and reinforced by a circular intermediate member 48 and intermediate transverse pieces, one 49 at the outer end of the preload arm and the other 50 adjacent the end of the latching arm 46.

Figure 2:
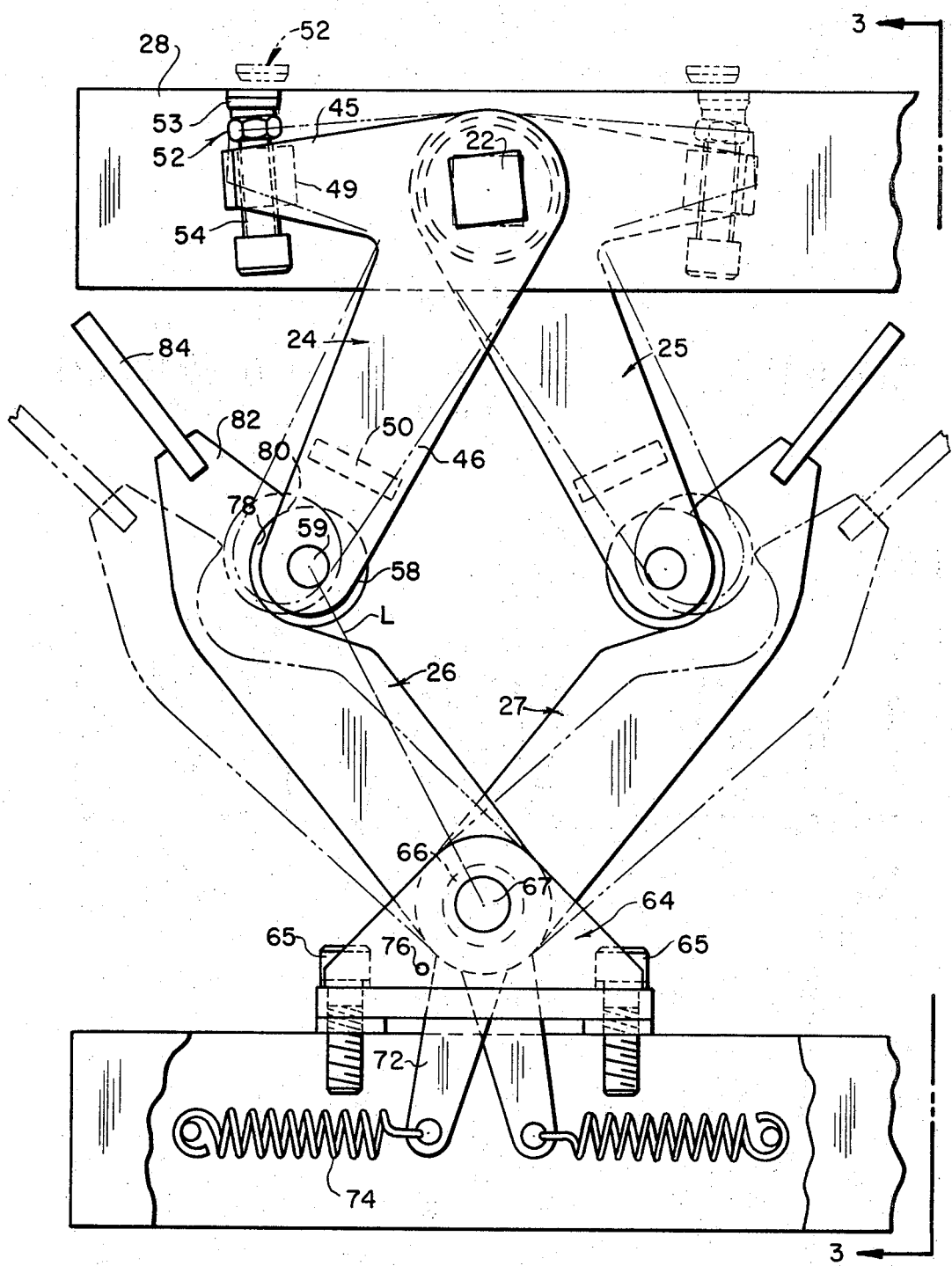
FIG. 2 is a front elevational view of a clamping assembly embodying the present invention.

An adjustable abutment 52 extends from the end of the preloading arm 45, upward in the orientation shown in FIGS. 1 to 3, for engagement with a clamping mechanism of the molding machine or with another suitable compressive mechanism, and serves to rotate the unlatched bell crank 24 in a direction to bring the latching arm 46 to a more vertical position and hence nearer to the lower platen 18 when acted upon by the clamping mechanism. The abutment is comprised of a toggle pad 53 on the end of a socket-head cap screw 54 that is adjustably received in a threaded bore of the reinforcing piece 49.

A roller 58 of relatively large diameter is rotatably carried at the lower end of the latching arm 46 of the bell crank member 24, for engaging the latching link 26. The roller is positioned between the two parts 24a, 24b of the bell crank 24 and carried by a roller axle 59 secured in the parts 24a, 24b by a set screw 60, shown in greater detail in connection with the bell crank 25, FIG. 3.

As best shown in FIG. 2, the bell crank latch member 24 is movable between the position shown in solid line and the position shown in broken line. In the broken line position, the torsion spring 22 is unstressed and the abutment 52 extends above the top of the frame side 28 of the platen 16. In the solid line position, the abutment 52 is flush with the upper surface of the frame side 28, the torsion spring 22 is twisted, and the roller 58 is moved closer to a vertical plane passing through the torsion spring and closer to the lower platen 18. The degree of rotation in the construction of the embodiment shown is approximately 4°.

The latching link 26 of the latch mechanism 20 is formed of a single member pivoted at its lower end to the bottom platen 18 in a vertical plane midway between the parts 24a, 24b, is located beneath the bell crank latch member in the orientation shown and is movable from an unlatched position to a latching position, where it engages the roller 58 to interconnect the upper and lower platens 16, 18. A pivot bracket 64 secures the link 26 to the frame side 32 of the lower platen, as by screws 65. The link 26 pivots on a bearing 66 about a pivot axle 67 held in the bracket 64 by a set screw 68, and is guided in proper alignment by spacers 69, 70, best shown in connection with the link 27 in FIG. 3.

A finger 72 and a tension spring 74 serve to bias the latching link 26 toward an upright position, i.e., in a direction toward a vertical plane through the pivot axle 67, which in the preferred embodiment is vertically aligned with the torsion spring 22.

The finger 72 extends downwardly from the latching link 26 through the pivot bracket 65, i.e., in a generally opposite direction from that of the link, relative to the pivot axle, and is connected at its end to the tension spring 74, which is carried by the frame side 32. A stop pin 76 on the pivot bracket 64 limits the extent to which the tension spring 74 can move the finger 72 and thereby limits the extent to which the latching link 26 can approach the vertical plane through the pivot axle. In the preferred embodiment, a relatively small degree of movement is permitted, approximately 10° of angular movement, to assure that the link is maintained in a position where it can engage the bell crank lever 24 when the mold halves are brought together.

The upper end of the latching link 26 has a recess 78 that receives the roller 58 of the bell crank latch member 24, to interlock or latch the two latch members 24, 26. The surface forming the recess 78 is in the general shape of a hook. The depth of the recess 78, relative to the roller 48 is such that a terminus 80 of the recess contacts the surface of the roller 58 just slightly beyond, i.e., over center from, an imaginary straight line L passing through the center of the pivot axle 67 of the latch member arm 26 and the center of the roller axle 59 of the roller 58, when the two latch members are engaged in a latched position. As a result, forces applied in a direction normal to the opposed platens and tending to separate the platens are effectively resisted by the engaged latch members and will not cause the latch members to disengage. However, a very slight pivotal movement of the latching link 26 in a direction away from the vertical plane through the pivot axle 67 will locate the terminus 80 of the recess 78 to the outside of the line L, resulting in the unlatching of the members. This is accomplished with only a slight camming movement of the bell crank latch member 24 by the link 26, against the resistance of the torsion spring 22.

When the bell crank latch member 24 and the latch link 26 are unlatched, i.e., in the broken line position shown in FIG. 2, the roller 58 is outside of the recess 78, in peripheral contact with the terminus of the recess 80. An inclined surface 82 beyond the recess 78 permits the roller 58 to cam the latching link 26 to the unlatched broken line position, when the upper and lower platens are initially moved vertically together. Upon pivoting of the bell crank latch member 24 to the solid line position, the tension spring 74 will cause the latching link 26 to move with the bell crank latch member to the latching, solid line, position.

Unlatching of the bell crank latch member 24 and latching link member 25 is accomplished by applying an external force to the latching link in a direction against the biasing force of the tension spring 74. The force required is not great, in comparison to the force of the torsion spring transmitted through the latching mechanism, because of the almost centered location of contact between the terminus 80 of the recess 78 on the roller 58 and because of the large diameter and free rotation of the roller 58. Unlatching of one latch member of each latch assembly 10 can be accomplished in machines where the mold assemblies are moved from station to station, by providing an abutment, such as a selectively positionable striker, adjacent one or both sides of the mold assembly where the latch mechanisms are located, operable to strike an extension 84 on the end of at least one latching link 26, 27 of each assembly and pivot it in a direction that will release the associated bell crank lever. This can be accomplished by moving the striker, e.g., lowering the striker at the unloading station to contact the extensions 84 on at least one latching link of each assembly or by moving the latching link extension into contact with a striker as the mold assembly is moved horizontally. Once one side of a latch assembly is released, the tension on the other side is completely eliminated because of the interconnection of the two latch mechanisms of each assembly through the common torsion spring. As a result, the opposite side latching mechanism is released automatically when separating mold halves.

Upon release of the latches the two platens 16, 18 are subjected to displacing forces, since the platen and mold assembly must absorb the energy of the torsion spring. Alignment of the platens and mold halves is maintained against such displacement forces and others, by alignment assemblies 90, 92 preferably located adjacent two diagonally opposite corners of the platens, as shown in FIG. 1. Each assembly is identical and only the assembly 90 will be described in detail. A guide pin 94 of the assembly 90 is carried by one platen, the lower platen 18 as shown, in a guide block 96 secured to the frame side 33 and extends upwardly. A receiving guide block 98 of the assembly 90 is secured to the other platen, the upper platen 16 as shown, and closely receives the upper end of the guide pin when the platens are positioned with the mold halves together and in proper vertical alignment. The assemblies 90, 92 serve to transmit transverse forces from the upper mold half to the lower mold half, which is secured to the table T, so that vertical alignment of the platens is maintained when the mold halves are together, independently of mold locating pins in the mold halves themselves.

Although the operation is apparent from the above description, it is briefly summarized, as follows: When the upper and lower platens 16, 18 and their associated mold halves 12, 14 are brought together in a vertical direction, the bell crank latch members 24, 25 of both latch assemblies 10, 10' and associated with the upper platen, and the respective latching links 26, 27 associated with the lower platen, engage prior to the meeting of the opposed mold member faces. The rollers 58 of the bell crank latch members contact the link surfaces 82 and cam the latching links 26, 27 of each latch assembly away from the latching position as the mold parts reach a closed position, to a position in which the roller 58 and recess 78 of each mechanism can be latched in response to the clamping of the molds in the machine. With the mold halves together, the assembly is moved, as by the table T, of the injection molding machine and the platens are pressed together by the main tonnage clamp of the machine, prior to the injection of the molding material. The pressure applied by the main tonnage clamp acts on the abutments 52 at the ends of the preloading arms 45 of the bell crank latching members 24, 26. This pivots the bell crank latching members in directions that move the associated latching rollers 58 toward the vertical plane passing through the respective torsion springs 22, 22', and closer to the lower platen 18. As the rollers are moved in that direction, the tension springs 74 cause the latching links 26, 27 on the lower platen 18 to follow the associated roller toward the vertical plane. When the abutments 52 reach a position flush with the upper edge of the platen 16, each roller 58 is located in a position that permits the lower latching links to rotate to a position where they receive the roller within the recess 78, with the terminus 80 of the recess slightly beyond center of the roller. When the main tonnage clamp is released, the torsion springs 22, 22', tend to return to their normal positions, indicated in broken line in FIG. 2 with respect to spring 22, but are resisted by the latching links 26, 27. As a result, the torsion springs apply a yieldable compressive load through the latching links 26, 27 to the lower platen 18, holding the two mold halves 12, 14 together. The force with which the mold members are urged together is dependent upon the characteristics of the torsion springs 22, 21' and the length of the latching arms 46 of the latching members, but of course, cannot exceed that force applied by the main tonnage clamp, used to initially distort the torsion springs. The force applied by the torsion springs 22, 22' assures that the mold members will be held together against the normal residual foaming pressure in structural foam molding, while at the same time permits any excessive pressure to relieve itself, should the pressure exceed that applied by the torsion springs. In this way, the selection of the torsion spring characteristics is used not only to retain the mold halves together against separating forces, but also to limit in a controlled manner the mold pressures that may be generated subsequent to material injection.

It will be apparent that the mold members may be removed from the injection machine immediately after injection of the material being molded, but will be held together under the desired pressure, during the remaining curing cycle. Separation of the mold members is accomplished by mechanically forcing the latching links 26, 27 from the solid line latched position shown in FIG. 2 to the unlatched position shown in broken line.

While a preferred embodiment of this invention has been described in detail, it will be apparent that modifications or alterations can be made, without departing from the spirit and scope of the invention set forth in the appended claims. For example, in its broader aspects, the invention does not require that the latch mechanism on opposite sides of a mold member be interrelated by the spring member, and means for biasing and providing movement of a latch member carried by one mold member, other than the torsion spring and bell crank assembly of the preferred embodiment, may be provided. Thus, in its broader aspects, the present invention may be practiced other than in the manner specifically disclosed, but at the expense of specifically advantageous features.

What is claimed is:

1. A latch mechanism for retaining mold members together and yieldably applying a compressive load thereto, comprising a first latch member carried with one of said mold members, a second latch member carried with another of said mold members and releasably engageable with said second latch member, each of said latch members being movable relative to the other and to the mold member with which it is carried, and biasing means carried with and operating between said first latch member and associated mold member resiliently biasing the first latch member in a direction relative to said second latch member that urges said mold members together when the first and second latch members are engaged.

2. A latch mechanism as set forth in claim 1 wherein said resiliently biased first latch member includes means to receive a force applied in a direction that urges the mold members together, for moving said first latch member to a latching position.

3. A latch mechanism as set forth in claim 2 including means carried with said second latch member and associated mold to bias said second latch member to said latching position.

4. A latch mechanism as set forth in claim 3 wherein said first and second latch members have surfaces that interengage and remain interengaged against forces tending to separate said mold members, and which cam the first latch member in a direction opposite to that in which it is resiliently biased when said second latching member is moved away from said latching position.

5. A latch mechanism as set forth in claim 4 wherein said first latch member is a pivoted bell crank with two arms, one carrying a roller and extending toward said second latch member and the other including said force receiving means, said second latch member is a pivoted link with a recess for receiving said roller, and said biasing means for said first latch member urges the arms of said bell crank away from the mold member with which the second latch member is carried and toward the recess of said second latch member.

6. A latch assembly for retaining opposed mold members together at two opposite locations and yieldably applying a compressive load to said members, comrising two latch mechanisms secured relative to and on opposite sides of two opposed mold members, each said latch mechanism including two releasably interengageable latch members each secured relative to an opposed one of said mold members, at least one of said latch members of each mechanism being movable relative to the mold members, and a torsion spring secured to and extending between said movable latch members of said two mechanisms operating between the movable latch members and the associated mold member biasing each of the movable latch members in a direction that urges said mold members together when the two latch members of each mechanism are engaged.

7. Latch apparatus for retaining mold members together at two opposite locations and yieldably applying a compressive load to said members, comprising two latch mechanisms secured relative to and on opposite sides of two opposed mold members, each said latch mechanism including two releasably interengageable latch members each secured relative to an opposed one of said mold members, both of said latch members of each mechanism being movable relative to the mold members, and means carried with one of said latch members of each mechanism and acting between the said one latch member and the mold member with which the means is carried, to resiliently bias said one latch member in a direction relative to the other that urges the mold members together when the latch members of the mechanisms are engaged.

8. A mold holding device comprising two spaced parallel platens adapted to support opposed mold members for relative movement together and apart, a plurality of latch mechanisms for connecting said platens and yieldably applying a compressive load to mold members between said platens, each said latch mechanism including first and second latch members one secured to each of said platens for relative movement into releasable interconnecting engagement with the other, and means carried with said first latch member of each mechanism, acting between the first latch member and the platen to which the first latch member is secured, resiliently biasing said first latch member in a direction relative to the second latch member that urges the platens toward each other when the latch members of the mechanisms are engaged.

9. A device as set forth in claim 8 wherein said first latch member of each mechanism includes means to receive a force applied in a direction that urges the platen together, for moving said first latch member to a latching position.

10. A latch mechanism as set forth in claim 9 including means carried with said second latch member and associated platen to bias said second latch member to a said latching position.

11. A latch mechanism as set forth in claim 10 wherein said first and second latch members of each mechanism have surfaces that interengage and remain interengaged against forces tending to separate said mold members, and which cam the first latch member in a direction opposite to that in which it is resiliently biased when said second latching member is moved away from said latching position.

12. A latch mechanism as set forth in claim 11 wherein said first latch member is a pivoted bell crank with two arms, one carrying a roller and extending toward said second latch member and the other including said force receiving means, said second latch member is a pivoted link with a recess for receiving said roller, and said biasing means for said first latch member urges the arms of said bell crank away from the mold member with which the second latch member is carried and toward the recess of said second latch member.

13. A latch mechanism set forth in claim 8 including alignment means having parts secured to each platen and interengaged when said mold members are together, to permit relative movement of the mold members together and apart and to resist relative movement of the mold members in other directions.

14. A latch mechanism for retaining mold members together and yieldably applying a compressive load thereto, comprising a first latch member carried with one of said mold members, a second latch member carried with another of said mold members and releasably engageable with said first latch member, each of said latch members being pivotable relative to the mold member with which it is carried, and means carried with and acting between said first latch member and associated mold member resiliently biasing the first latch member in a rotational direction that urges said mold members together when the first and second latch members are engaged.

15. A latch mechanism as set forth in claim 14 wherein said resiliently biased first latch member includes a latching arm for engaging said second latch member and an actuating arm to receive a force applied in a direction that urges the mold members together for pivoting said latching arm to a latching position.

16. A latch mechanism for retaining mold members together and yieldably applying a compressive load thereto, comprising a first latch member carried with a first of said mold members, a second latch member carried with a second of said mold members, said first latch member including a part pivotable relative to said first mold member, said second latch member including a part pivotable relative to said second mold member, said two parts having interengageable surfaces capable of retaining the latch members interconnected against first forces tending to separate the mold members while facilitating disengagement through pivotal movement in response to second forces substantially smaller than said first forces and exerted in a direction to produce pivotal movement, means carried with said first latch member and associated mold member resiliently biasing the pivotable part of said first latch member in a first direction that urges said mold members together when said surfaces of the two pivotable parts of the latch members are interengaged, and means to transmit a force to said pivotable part of said first latch member to pivot it in a second direction rotationally opposite to said first direction and into a position where said surfaces of said two pivotable parts are interengaged.

* * * * *